US010476051B2

(12) United States Patent
Mardall et al.

(10) Patent No.: US 10,476,051 B2
(45) Date of Patent: Nov. 12, 2019

(54) BATTERY PACK BASE PLATE HEAT EXCHANGER

(71) Applicant: Tesla, Inc., Palo Alto, CA (US)

(72) Inventors: Joseph Mardall, San Francisco, CA (US); Paul Yeomans, Gloucestershire (GB)

(73) Assignee: Tesla, Inc., Palo Alto, CA (US)

( * ) Notice: Subject to any disclaimer, the term of this patent is extended or adjusted under 35 U.S.C. 154(b) by 1274 days.

(21) Appl. No.: 13/736,217

(22) Filed: Jan. 8, 2013

(65) Prior Publication Data

US 2014/0193683 A1     Jul. 10, 2014
US 2017/0214008 A9     Jul. 27, 2017

Related U.S. Application Data

(63) Continuation-in-part of application No. 13/475,966, filed on May 19, 2012, now Pat. No. 8,557,416.
(Continued)

(51) Int. Cl.
*H01M 2/10* (2006.01)
*H01M 10/625* (2014.01)
(Continued)

(52) U.S. Cl.
CPC ....... *H01M 2/1016* (2013.01); *H01M 2/1077* (2013.01); *H01M 2/1083* (2013.01);
(Continued)

(58) Field of Classification Search
CPC .................................................. H01M 2/1016
See application file for complete search history.

(56) References Cited

U.S. PATENT DOCUMENTS 7,654,352 B2 *   2/2010   Takasaki .................. B60K 1/04
                                                                 180/65.1
2009/0023056 A1   1/2009   Adams et al.
(Continued)

FOREIGN PATENT DOCUMENTS

FR             2974453 A1 *  10/2012  .......... H01M 10/615

OTHER PUBLICATIONS http://www.engineeringtoolbox.com/thermal-conductivity-d_429.html., see p. 2.*
Machine Translation FR2974453(A1) (Year: 2012).*

*Primary Examiner* — Stewart A Fraser
*Assistant Examiner* — Victoria H Lynch
(74) *Attorney, Agent, or Firm* — Knobbe Martens Olson & Bear LLP

(57) ABSTRACT

A heat exchanger integrated into an electric vehicle's battery pack enclosure is provided, where the heat exchanger conduits are mechanically and thermally coupled to the inside surface of the enclosure base plate and where the battery pack enclosure is mounted such that ambient air flows over the outside surface of the enclosure base plate during vehicle motion. A thermal management system is coupled to, and controls operation of, the integrated battery pack heat exchanger such that in a first operational mode the heat exchanger is thermally coupled to the batteries within the battery pack, and in a second operational mode the heat exchanger is thermally decoupled from the batteries within the battery pack.

17 Claims, 15 Drawing Sheets

Related U.S. Application Data which is a continuation-in-part of application No. 13/475,955, filed on May 19, 2012, now Pat. No. 8,557,415, which is a continuation-in-part of application No. 13/076,003, filed on Mar. 30, 2011, now Pat. No. 8,268,469, which is a continuation-in-part of application No. 12/798,198, filed on Mar. 30, 2010, now Pat. No. 8,277,965, which is a continuation-in-part of application No. 12/386,684, filed on Apr. 22, 2009, now abandoned, and a continuation-in-part of application No. 12/386,684, filed on Apr. 22, 2009, now abandoned.

(60) Provisional application No. 61/426,254, filed on Dec. 22, 2010.

(51) Int. Cl.
*H01M 10/6556* (2014.01)
*H01M 10/6562* (2014.01)

(52) U.S. Cl.
CPC ..... *H01M 10/625* (2015.04); *H01M 10/6556* (2015.04); *H01M 10/6562* (2015.04)

(56) References Cited

U.S. PATENT DOCUMENTS

| | | | |
|---|---|---|---|
| 2010/0025006 A1 | 2/2010 | Zhou | |
| 2010/0104938 A1 | 4/2010 | Hermann | |
| 2011/0296855 A1* | 12/2011 | Johnston | B60L 3/0046 62/79 |
| 2012/0174402 A1* | 7/2012 | Heckenberger | B23K 1/20 29/890.054 |
| 2012/0237803 A1* | 9/2012 | Mardall | B60L 3/0046 429/53 |
| 2013/0302653 A1* | 11/2013 | Pham | H02J 7/00 429/50 |

* cited by examiner

BATTERY PACK BASE PLATE HEAT EXCHANGER

CROSS REFERENCE TO RELATED APPLICATIONS

The present U.S. Utility Patent Application claims priority pursuant to 35 U.S.C. § 120 as a continuation-in-part of U.S. patent application Ser. No. 13/475,966, filed May 19, 2012, issued as U.S. Pat. No. 8,557,416, which is a continuation-in-part of U.S. patent application Ser. No. 13/475,955, filed May 19, 2012, issued as U.S. Pat. No. 8,557,415, which is a continuation-in-part of U.S. patent application Ser. No. 13/076,003, filed Mar. 30, 2011, issued as U.S. Pat. No. 8,268,469, which claims priority pursuant to 35 U.S.C. § 119(3) to U.S. Provisional Application No. 61/426,254, filed Dec. 22, 2010, expired.

U.S. patent application Ser. No. 13/076,003 also claims priority pursuant to 35 U.S.C. § 120 as a continuation-in-part of U.S. patent application Ser. No. 12/386,684, filed on Apr. 22, 2009, abandoned, and 12/798,198, filed Mar. 30, 2010, issued as U.S. Pat. No. 8,277,965.

U.S. patent application Ser. No. 12/798,198 also claims priority pursuant to 35 U.S.C. § 120 as a continuation-in-part of U.S. patent application Ser. No. 12/386,684, filed on Apr. 22, 2009, abandoned.

FIELD OF THE INVENTION

The present invention relates generally to vehicles and, more particularly, to an automotive heat exchanger.

BACKGROUND OF THE INVENTION

Vehicle cooling systems vary widely in complexity, depending primarily upon the thermal requirements of the various vehicle systems employed in the vehicle in question. In general, these cooling systems utilize heat exchangers of one form or another to transfer the heat generated by the vehicle subsystems to the surrounding ambient environment. Such heat transfer may either be performed directly, for example in the case of a simple radiator coupled to a vehicle engine, or indirectly, for example in the case of a thermal management system utilizing multiple heat transfer circuits to transfer the heat through multiple stages in order to sufficiently lower the temperature of the component in question.

In general, vehicle heat exchangers are designed to exchange heat between two different fluids, or two similar fluids that are at different temperatures, thereby helping to maintain the various vehicle systems and components within a safe and effective operating range of temperatures. One of the fluids is typically composed of a refrigerant or water, the water often mixed with ethylene glycol or propylene glycol or a similar liquid that provides anti-freeze protection at low temperatures. In many vehicle heat exchangers such as condensers and radiators, the second fluid is air which is forced to flow through the heat exchanger, either as a result of vehicle movement or through the use of a fan.

Within the automotive industry there are several types of air heat exchangers, the design of each being based on their intended application. Exemplary heat exchangers include:

A powertrain radiator in which a coolant-to-air heat exchanger is used to remove heat from an internal combustion engine or electric motor.

A condenser in which a refrigerant-to-air heat exchanger is used to remove heat for cabin air conditioning systems or other systems (e.g., battery packs and power electronics) that employ refrigerant as the cooling fluid.

A transmission oil cooler in which an oil-to-air heat exchanger is used to remove heat from the transmission via the transmission fluid.

A steering pump oil cooler in which an oil-to-air heat exchanger is used to remove heat from the steering system via the steering fluid.

A charge air cooler in which an air-to-air heat exchanger is used to remove heat from turbocharged (compressed) air used in the engine intake system.

For a given set of fluid temperatures, the performance of a fluid-to-fluid heat exchanger depends primarily on the surface area of the heat exchanger and the volume flow rate of the two fluids through the heat exchanger. Flow rate is commonly determined as the fluid velocity through the heat exchanger multiplied by the frontal area of the heat exchanger. Larger heat exchanger surface areas and mass flow rates result in greater heat transfer from the inner fluid to the outer fluid. An increase in these same variables, however, also results in an increase in the hydraulic losses, or pressure drop losses, which are manifested in increased aerodynamic drag (i.e., vehicle motive power), pump power, and fan power. Additionally, in a fluid-to-fluid heat exchanger, the transfer of heat between the two fluids increases as the temperature difference between the two fluids increases.

In a conventional vehicle utilizing multiple heat exchangers, regardless of whether the vehicle utilizes a combustion engine, an electric motor, or a combination of both (i.e., a hybrid), the individual heat exchangers are typically positioned one in front of the other, followed by a fan, this configuration referred to as a "stack". In such a stacking arrangement, commonly the heat exchanger with the lowest outlet air temperature is located upstream, followed by higher temperature heat exchangers downstream. An example of such a configuration is a condenser followed directly by an engine radiator, followed by one or more fans. While this arrangement is more common with vehicles utilizing a combustion engine, hybrid vehicles may also use a stack of heat exchangers in order to provide cooling for the battery pack, power electronics and the motor. A principal drawback of the practice of stacking heat exchangers is an increase in hydraulic losses (i.e., fan power, aerodynamic drag) that result regardless of whether each heat exchanger in the stack is in active use. Additionally, since the temperature of the air entering the inner heat exchanger(s) will be the temperature of the air exiting the upstream heat exchanger which is typically higher than the ambient temperature, the efficiency and overall performance of the inner heat exchanger(s) is compromised. As a consequence, it is common practice to increase the surface area or thickness of the downstream heat exchangers to compensate for this decrease in expected performance which, in turn, adds weight and cost to the affected heat exchangers.

While a variety of different techniques and system configurations have been used to control the temperatures of the various subsystems and components in a vehicle, they are often inefficient, which in turn affects vehicle performance. Accordingly, what is needed is a thermal management system that achieves efficient heat transfer while effectively utilizing vehicle surfaces. The present invention provides such a thermal management system.

SUMMARY OF THE INVENTION

An integrated battery pack heat exchanger system is provided that is comprised of a battery pack enclosure mounted under an electric vehicle that includes an enclosure top panel, an enclosure base plate, and a plurality of enclosure side members, where the battery pack enclosure is configured to hold a plurality of batteries. The battery pack enclosure is mounted between the vehicle's passenger cabin floor panel and the driving surface (e.g., road) such that the outside surface of the enclosure base plate is exposed to the ambient environment so that ambient air flows past the outside surface during vehicle motion. The system further includes a plurality of heat exchanger conduits mechanically and thermally coupled to the inside surface of the enclosure base plate, and a thermal management system that is coupled to, and controls operation of, the integrated battery pack heat exchanger system. When the thermal management system configures the integrated battery pack heat exchanger system into a first operational mode, the plurality of heat exchanger conduits are thermally coupled to the batteries. When the thermal management system configures the integrated battery pack heat exchanger system into a second operational mode, the plurality of heat exchanger conduits are thermally decoupled from the batteries. In at least one embodiment the heat exchanger conduits are thermally coupled to at least one of the traction motor, transmission, battery charging system and power electronics module when the integrated battery pack heat exchanger system is in either the first or second operational modes, although a heat exchanger bypass valve may be included to provide further control over operation of the heat exchanger.

In at least one embodiment, a layer of thermally insulating material, preferably with a thermal conductivity of less than 1.0 W/m-K, is interposed between the batteries and the heat exchanger conduits.

The heat exchanger conduits may be attached to the inside surface of the battery enclosure base plate by brazing, soldering, welding or bonding. The heat exchanger conduits may be integrated into the enclosure base plate. The outside surface of the enclosure base plate may include a plurality of thermally conductive fins to enhance thermal energy withdrawal.

In at least one embodiment, the system includes a blower fan that may be used to direct air over the outside surface of the enclosure base plate. The blower fan may be mounted within the vehicle and an air duct used to direct the output of the blower fan over the outside surface of the enclosure base plate. The outside surface of the base plate may include at least one slot or at least one closed channel.

The system may include a first coolant loop thermally coupled to the batteries using a first circulation pump to circulate coolant, a second coolant loop thermally coupled to the heat exchanger conduits and at least one of the traction motor, transmission, battery charging system and power electronics module and using a second circulation pump to circulate coolant, and a dual mode valve system coupled to the thermal management system. In the first operational mode the dual mode valve system is configured in a first mode in which the first coolant loop is serially coupled to the second coolant loop. In the second operational mode the dual mode valve system is configured in a second mode in which the first coolant loop operates in parallel with and separate from the second coolant loop. A heat exchanger bypass valve may be integrated into the second coolant loop, where the heat exchanger bypass valve controls flow of coolant through the heat exchanger conduits. The dual mode valve system may be comprised of a four-way valve, where in the first mode the four-way valve couples a first portion of the first coolant loop to a second portion of the second coolant loop and couples a first portion of the second coolant loop to a second portion of the first coolant loop, and where in the second mode the four-way valve couples the first portion of the first coolant loop to the second portion of the first coolant loop and couples the first portion of the second coolant loop to the second portion of the second coolant loop. The system may include a refrigeration subsystem thermally coupleable to the first coolant loop via a refrigeration subsystem heat exchanger. the refrigeration subsystem may include a refrigerant, compressor, condenser and thermostatic expansion valve. The system may further include a cabin HVAC system thermally coupleable to the refrigeration subsystem via the refrigeration subsystem heat exchanger. The system may include a heater thermally coupled to the first coolant loop.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably and may refer to any of a variety of different cell types, chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries contained within a single piece or multi-piece housing, the individual batteries electrically interconnected to achieve the desired voltage and capacity for a particular application. The term "electric vehicle" as used herein refers to either an all-electric vehicle, also referred to as an EV, or a hybrid (HEV)/plug-in hybrid (PHEV) vehicle, where hybrid vehicles utilize multiple propulsion sources one of which is an electric drive system.

Figure 1:
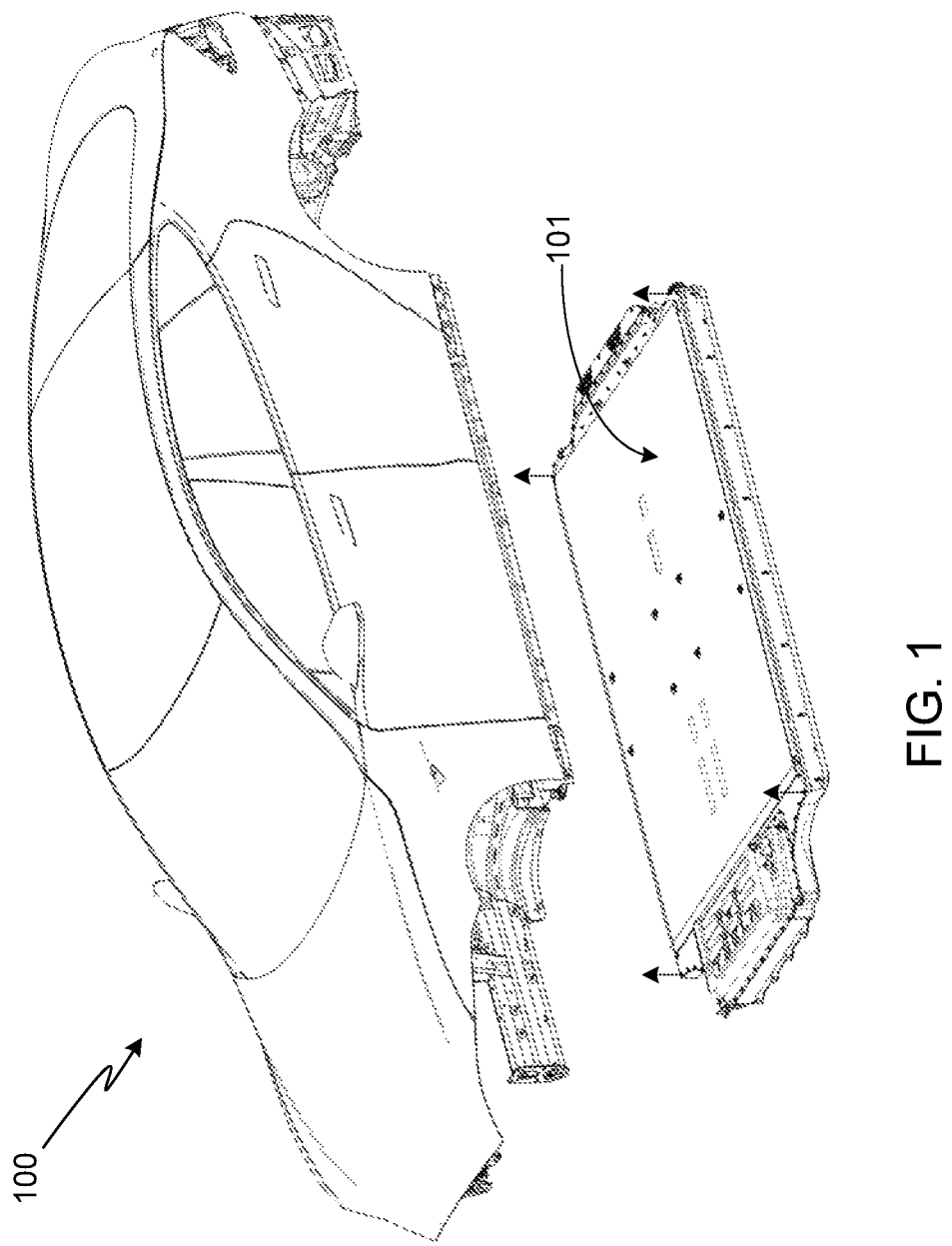
FIG. 1 provides a perspective view of a portion of a vehicle body and frame with the battery pack separated from the structure.
Figure 2:
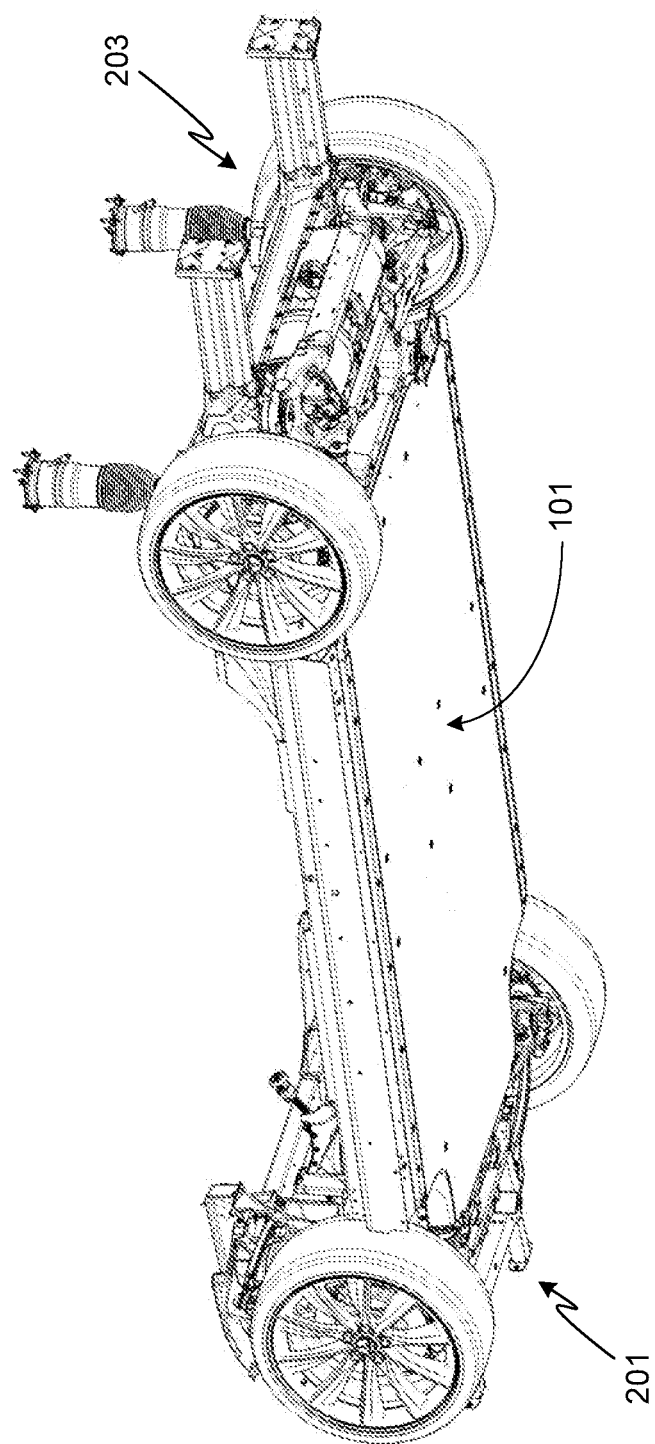
FIG. 2 provides a perspective view of a vehicle's undercarriage with the battery pack incorporated into the vehicle structure.
Figure 3:
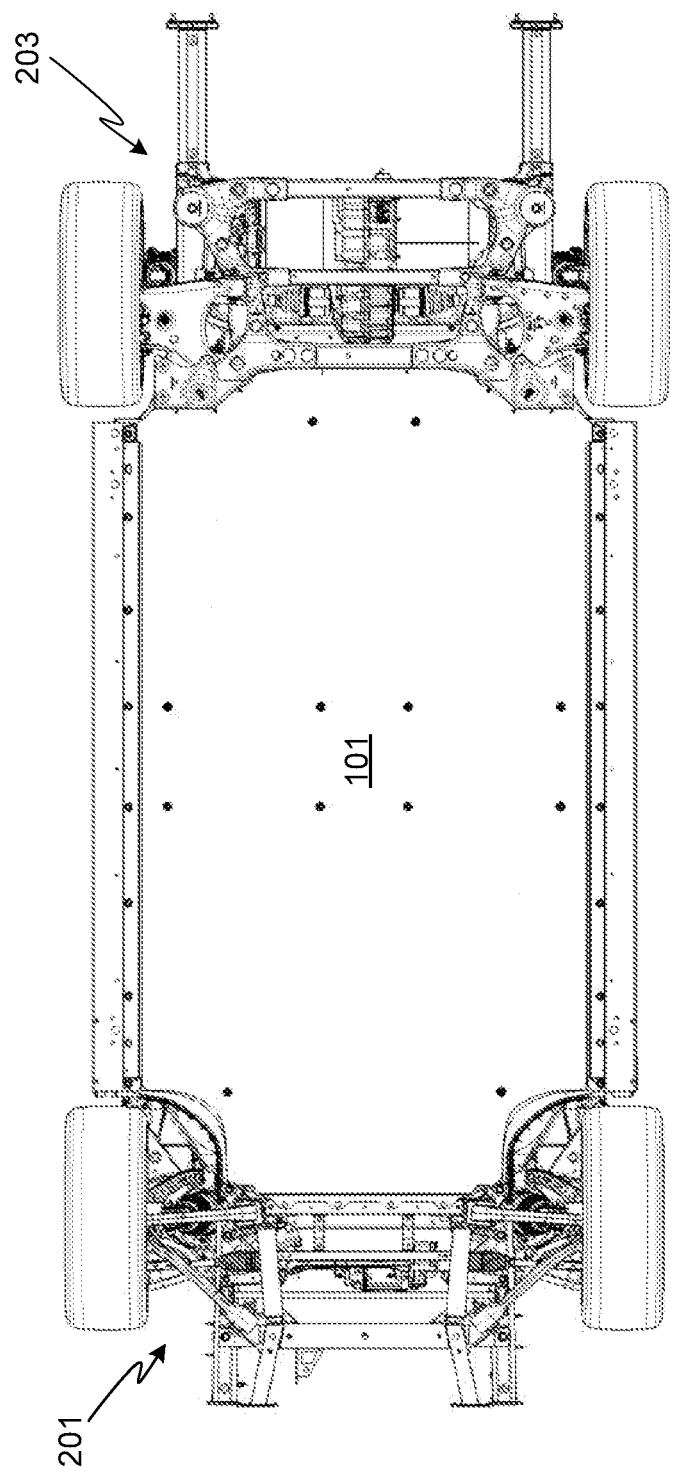
FIG. 3 provides a simplified bottom view of an electric vehicle with a battery pack incorporated into the vehicle structure.

In accordance with the present invention, and as described in detail below, a heat exchanger is integrated into a battery pack structure. In order to achieve optimal heat transfer, the heat exchanger is integrated into a surface of the battery pack that is exposed to the ambient environment and over which air flows during vehicle motion. To achieve these goals as well as provide a large heat transfer surface, preferably the battery pack is mounted under the floor panel of an electric vehicle as illustrated in FIGS. 1-3. Preferably battery pack 101 is integrated within the vehicle 100's structural frame, thus utilizing the battery pack's inherent rigidity and strength to enhance the overall performance and impact resistance of vehicle 100. In the illustrated embodiment, battery pack 101 not only transverses the width of the vehicle, i.e., from rocker panel to rocker panel, but also extends most of the distance between the front suspension 201 and the rear suspension 203. It will be appreciated that while smaller battery packs mounted under the vehicle's floor panel(s) may be used with the invention, smaller packs provide less thermal transfer surface area and thus are less desirable. In the illustrated embodiment, battery pack 101 is approximately 2.7 meters long and 1.5 meters wide and has a thickness that varies between approximately 0.1 meters to 0.18 meters, the thicker dimension applicable to those portions of the battery pack in which battery modules are stacked one on top of another.

Figure 4:
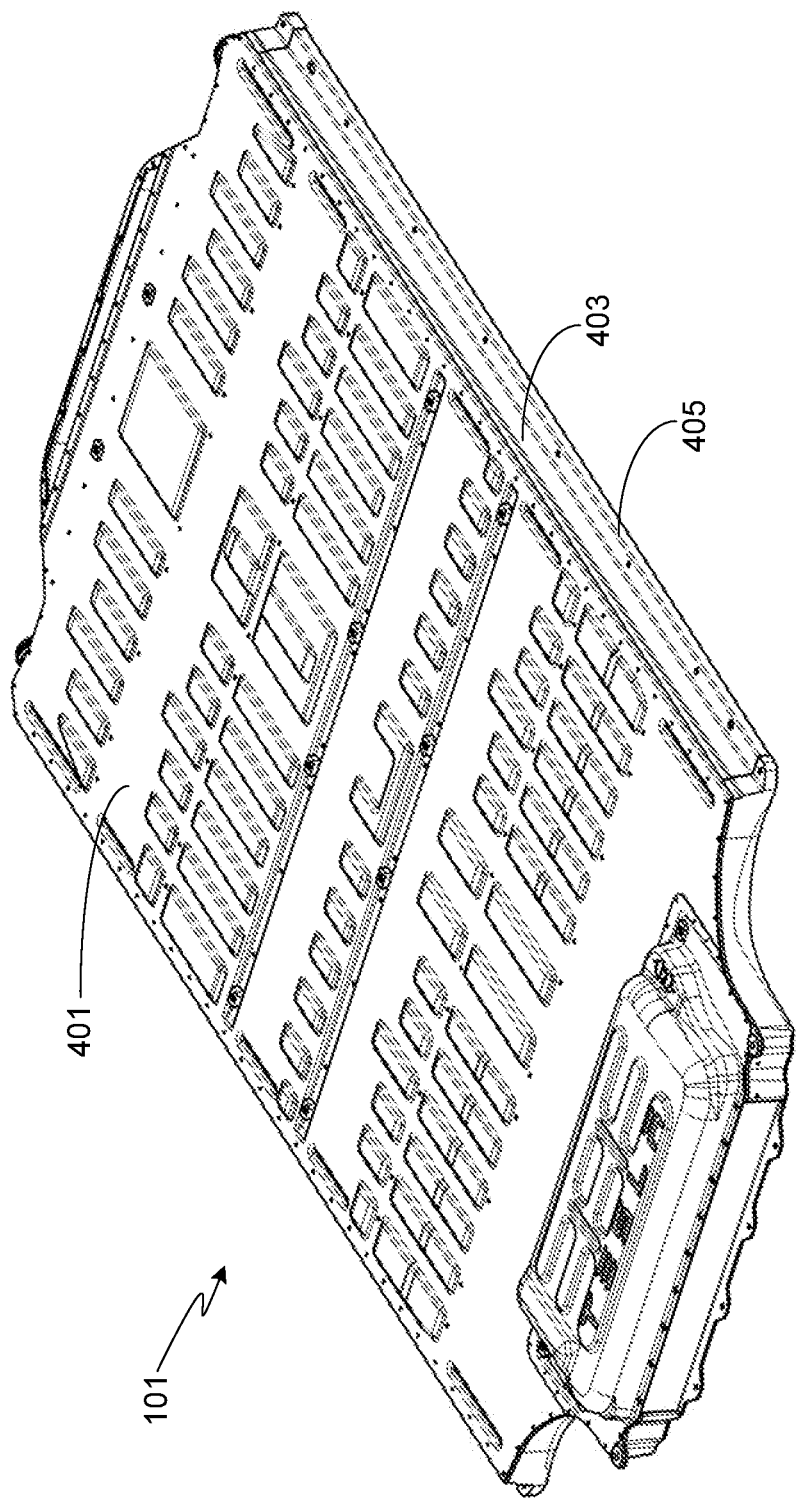
FIG. 4 provides a perspective view of the battery pack shown in FIGS. 1-3.

As noted above, preferably battery pack 101 is configured to transverse the width of the vehicle and be coupled to the rocker panels located on either side of the vehicle. FIG. 4 provides a perspective top view of battery pack 101 with the top enclosure panel 401 in place, panel 401 preferably providing a substantially airtight seal. Side structural elements 403, which are preferably hollow or include multiple cavities, are also visible as is battery pack mounting flange 405 that is used to couple the battery pack enclosure to the vehicle structure (not shown in this view). Preferably mounting flange 405 is perforated as shown in order to allow passage of a plurality of mounting bolts.

Figure 5:
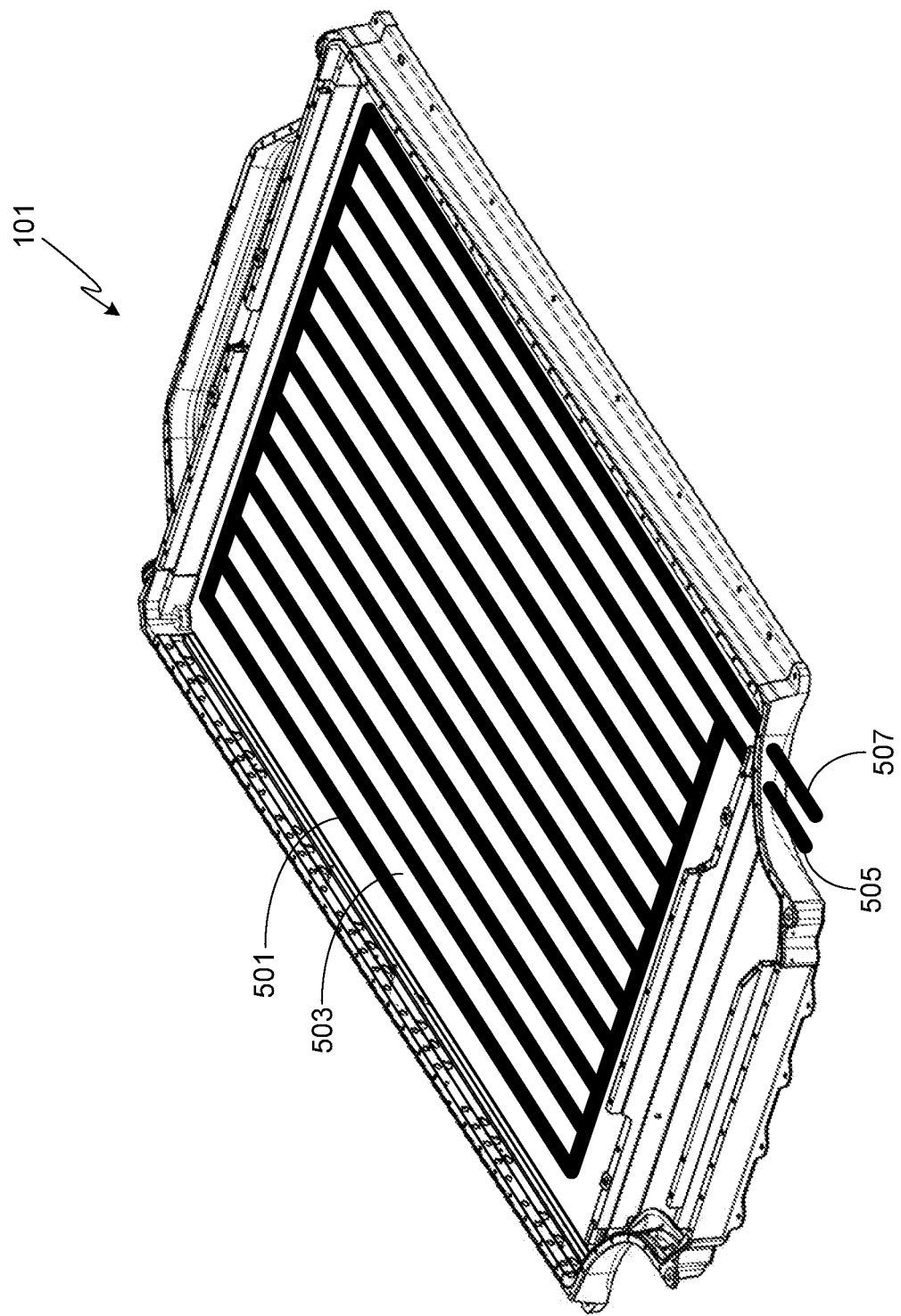
FIG. 5 provides a perspective view of the battery pack shown in FIG. 4 with the top panel removed and the heat exchange tubing visible.

FIG. 5 shows battery pack 101 with top member 401 removed, this view showing heat exchange manifold tubing 501, also referred to herein as heat exchanger conduits, thermally coupled to battery pack base plate 503. Base plate 503 is fabricated from a thermally conductive material (e.g., aluminum, steel, etc.). Heat exchange tubing 501 may be attached to base plate 503 using any technique that allows efficient transfer of heat from tubing 501 to the base plate, and that is compatible with the materials used for both tubing 501 and plate 503. Exemplary techniques include brazing, welding, soldering, and bonding with a thermally conductive adhesive. It will be appreciated that the configuration shown in FIG. 5 is but one possible configuration. The number and location of heat transfer tubing 501 may be modified to achieve the desired thermal performance. Additionally, the system may be configured to include more than one heat exchange manifold, for example side by side manifolds that are coupled to two different thermal systems. Visible in FIG. 5 are the heat exchanger inlet 505 and outlet 507.

Figure 6:
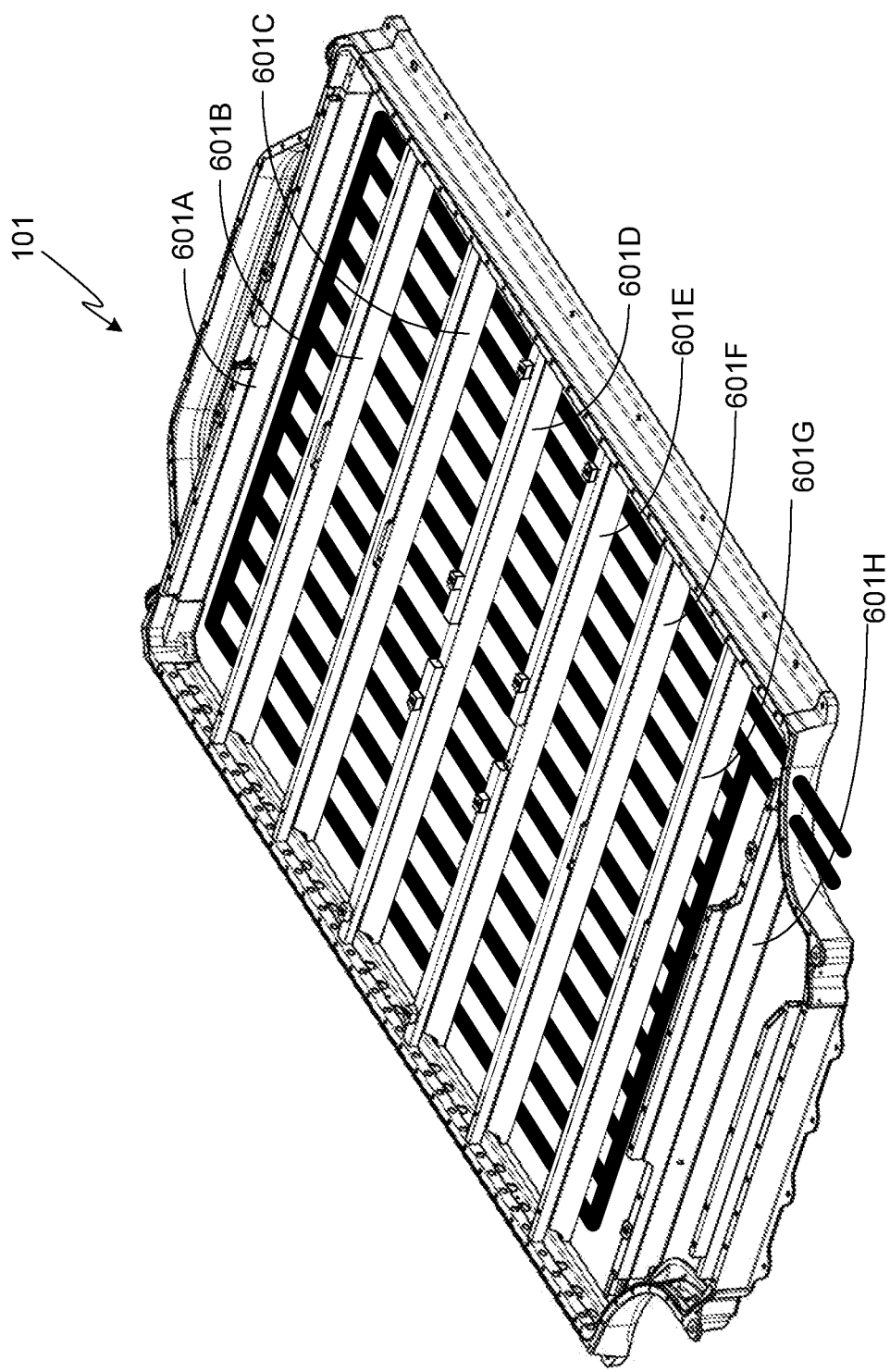
FIG. 6 provides a similar view to that of FIG. 5, this view including battery pack cross-members.

FIG. 6 shows battery pack 101 with the inclusion of multiple cross-members 601A-601H. The number of cross-members is based on the number of cells/cell modules that are to be encased within the battery pack as well as the desired structural characteristics of the battery pack. Typically battery pack side members 403, including mounting flanges 405, battery pack top panel 401, battery pack base plate 503 and cross-members 601A-601H are each fabricated from a light weight metal, such as aluminum or an aluminum alloy, although other materials such as steel may be used for some or all of the battery pack components. Base plate 503 may be welded, brazed, soldered, bonded or otherwise attached to side members 403, with the resultant joint between plate 503 and members 403 preferably being substantially air-tight as well as being strong enough to allow base plate 503 to support the batteries contained within the pack. Top panel 401 is typically attached to side members 403 using bolts or similar means, thus simplifying battery replacement as well as allowing battery interconnects, battery pack components, cooling system components and other battery pack components to be repaired and/or replaced.

Cross-members 601A-601H provide several benefits. First and foremost, cross-members 601A-601H provide mechanical and structural strength and rigidity to the battery pack and to the vehicle to which the battery pack is attached. Additionally, cross-members 601A-601H help to segregate thermal events by providing a thermal barrier between groups of cells as well as minimizing gas flow between adjacent battery pack sections. By segregating thermal events within smaller groups of cells, thermal runaway propagation is limited as is the potential for battery pack damage.

Figure 7:
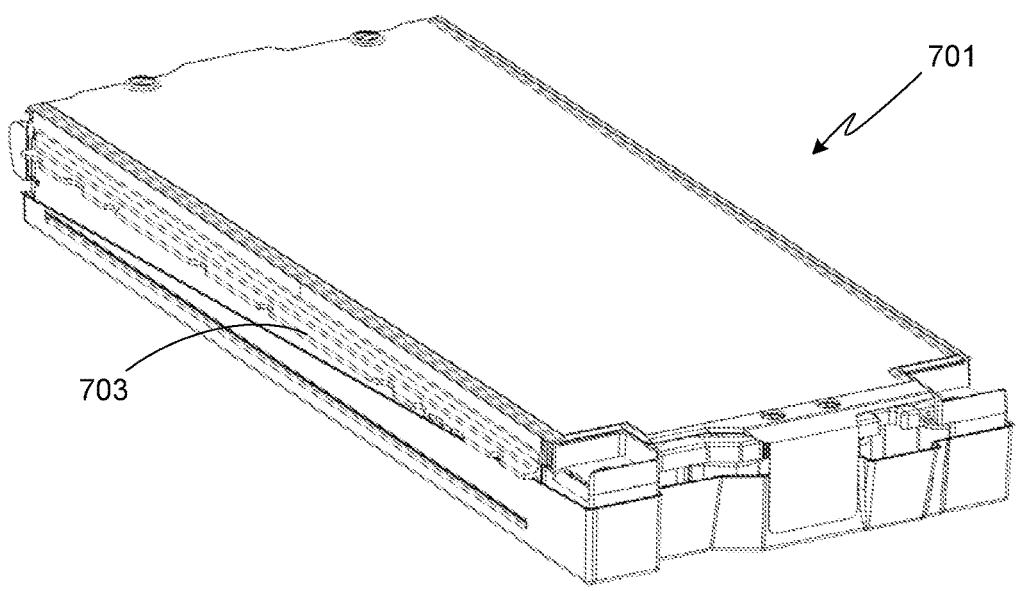
FIG. 7 provides a perspective view of a single battery module for use within the illustrated battery pack.
Figure 8:
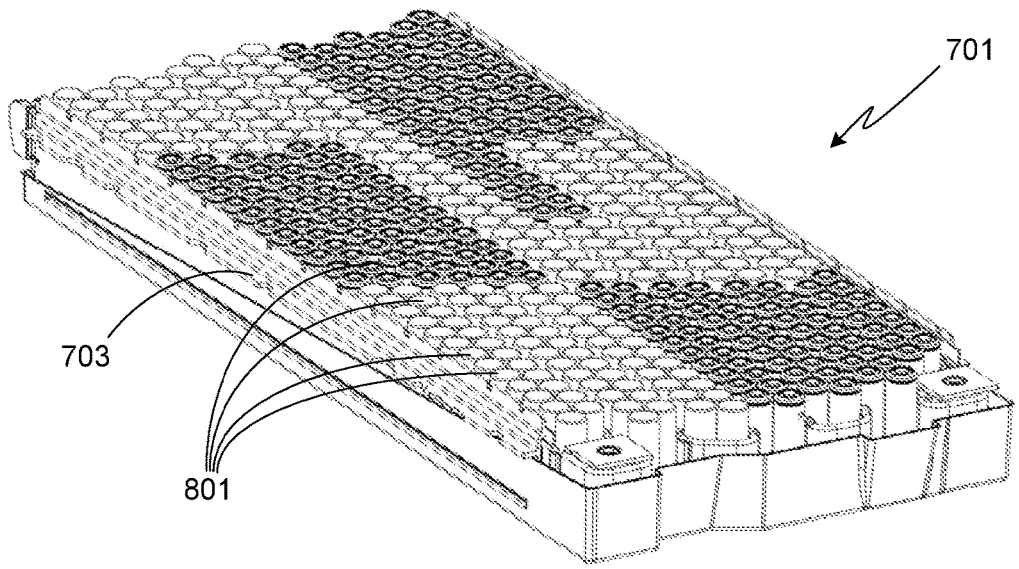
FIG. 8 illustrates the battery module shown in FIG. 7 with the upper module components removed.
Figure 9:
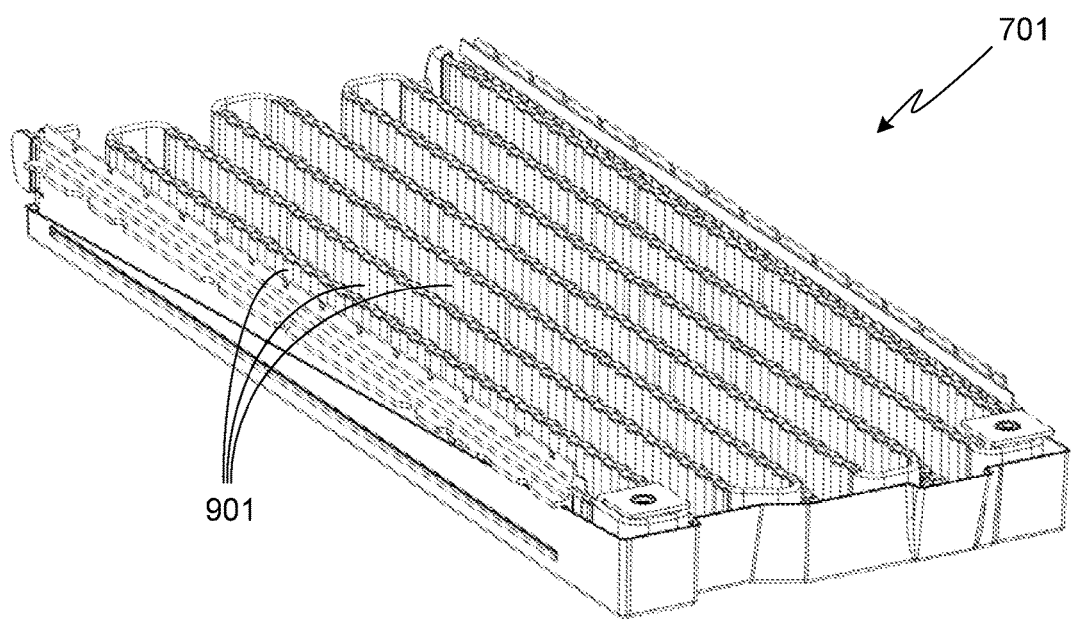
FIG. 9 illustrates the battery module shown in FIGS. 7 and 8 with the cells removed.

As noted above, cross-members 601A-601H segregate the battery pack enclosure into regions. Preferably two battery modules 701 are positioned within each region. FIG. 7 provides a perspective view of a single module 701, this view highlighting the module mounting flanges 703. In this configuration, mounting flanges 703 are located on either side of each module and, during battery pack assembly, are captured between upper and lower sections of each cross-member. FIG. 8 shows the previously illustrated battery module with the upper module portion removed as well as several of the upper module components (e.g., cell locator plate, current collector plate, etc.), thus making the individual cells 801 visible. In this embodiment each module 701 contains 370 individual cells 801, each cell utilizing an 18650 form factor. Note that the orientation of cells 801 within module 701 varies. FIG. 9 provides a similar view to that of FIG. 8, with the exception that cells 801 have been removed. With the removal of cells 801, the cooling conduits 901 are visible, conduits 901 being coupled to the battery pack thermal management system (not shown). It should be understood that the present invention does not rely on a particular implementation of the battery pack enclosure, nor does it rely on a particular implementation of the batteries and battery modules that are contained within the battery pack enclosure; the invention is equally applicable to other configurations, for example utilizing batteries with a different form factor, modules with a different form factor, a larger or smaller number of cells, individual cells versus modules, etc.

Figure 10:
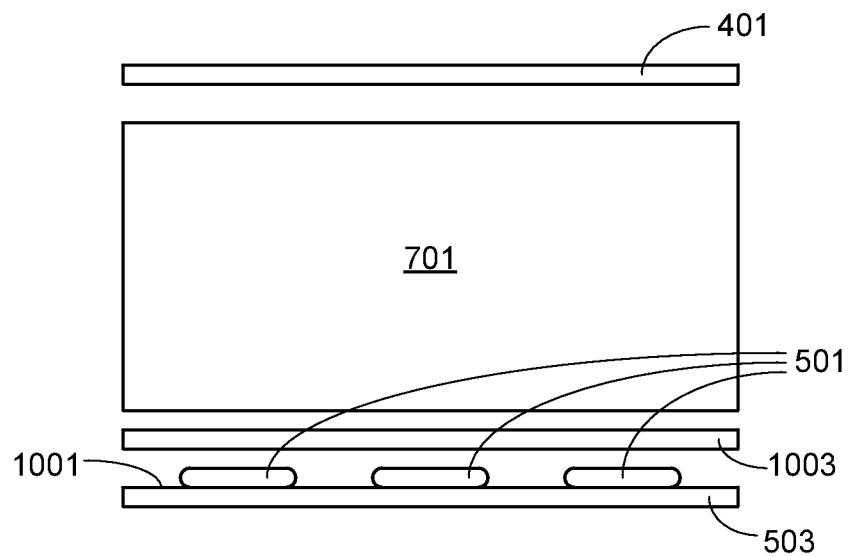
FIG. 10 provides a schematic cross-sectional view of a portion of a battery pack enclosure in accordance with one embodiment of the invention.
Figure 11:
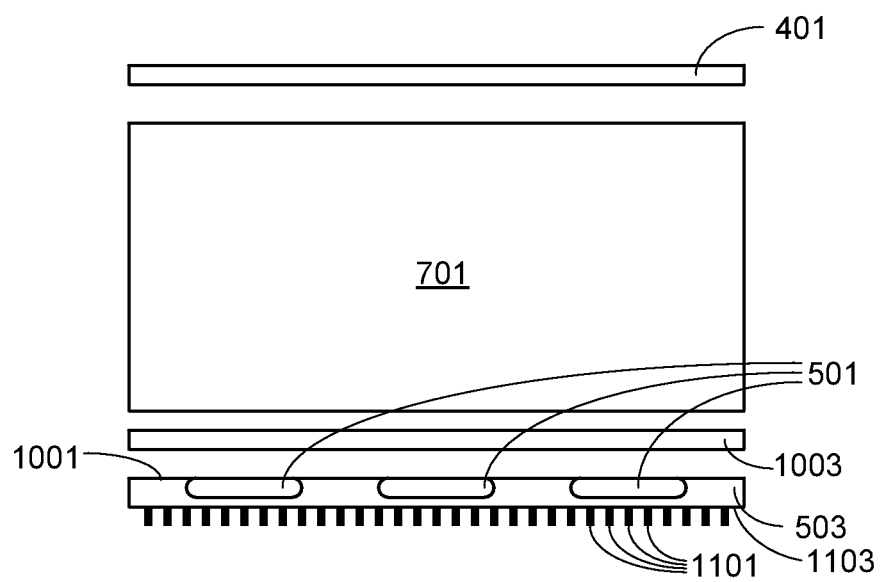
FIG. 11 provides a schematic cross-sectional view of a portion of a battery pack enclosure in accordance with an alternate embodiment of the invention.

FIGS. 10 and 11 provide schematic cross-sectional views of a portion of a battery pack enclosure, these views illustrating some of the various heat exchanger configurations that may be used with the present invention. FIG. 10 shows the heat exchanger tubing 501 attached to the inner surface 1001 of base plate 503 while FIG. 11 shows the same tubing 501 integrated within base plate 501. In some configurations, depending upon the desired operating temperature of the batteries as well as the operating temperature of the other components coupled to the thermal management system (e.g., motor, transmission, charger, power electronics, etc.), it may be necessary to position a thermal insulator 1003 between the heat exchanger tubing 501 and the batteries/battery modules, thus preventing thermal transfer unless it is desired. Preferably the thermally insulating layer 1003 has a thermal conductivity of less than 1.0 W/m-K; more preferably the thermally insulating layer 1003 has a thermal conductivity of less than 0.2 W/m-K. Also visible in FIG. 11 are a plurality of thermally conductive features (e.g., fins) 1101 that extend from the lower surface 1103 of base plate 503 and enhance the withdrawal of heat from the heat exchanger. It will be appreciated that thermally conductive features, such as the illustrated fins, may be applied to other configurations of the heat exchanger. Similarly, whether or not a thermally isolating member 1003 is used depends upon the thermal requirements of the system, not on a particular embodiment of the battery pack.

Figure 12:
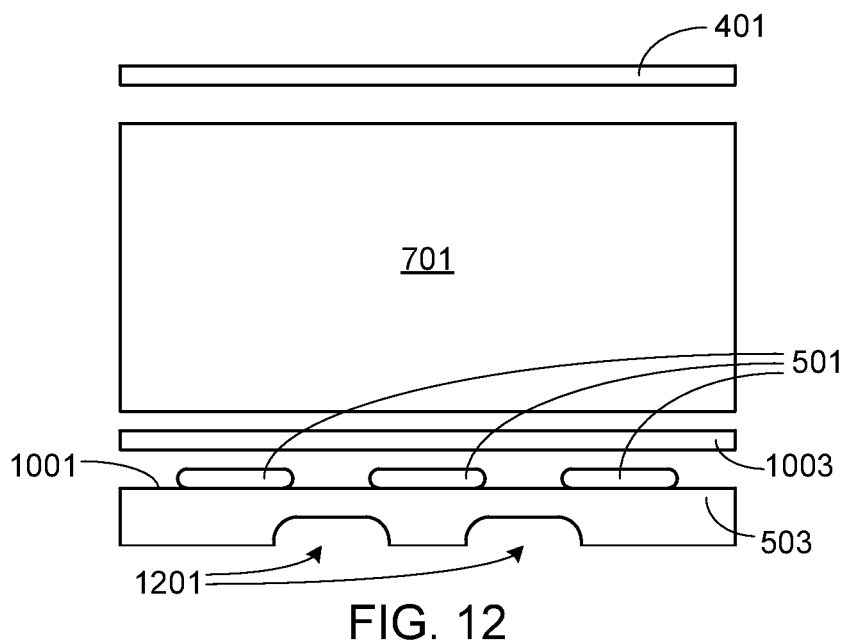
FIG. 12 illustrates the configuration shown in FIG. 10, with the addition of external base plate cooling slots.
Figure 13:
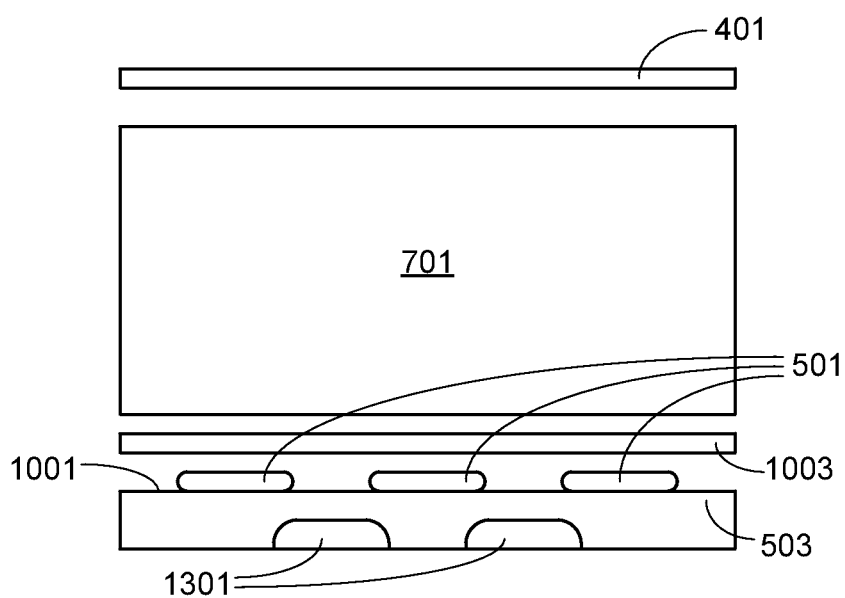
FIG. 13 illustrates the configuration shown in FIG. 10, with the addition of external base plate closed cooling channels.
Figure 14:
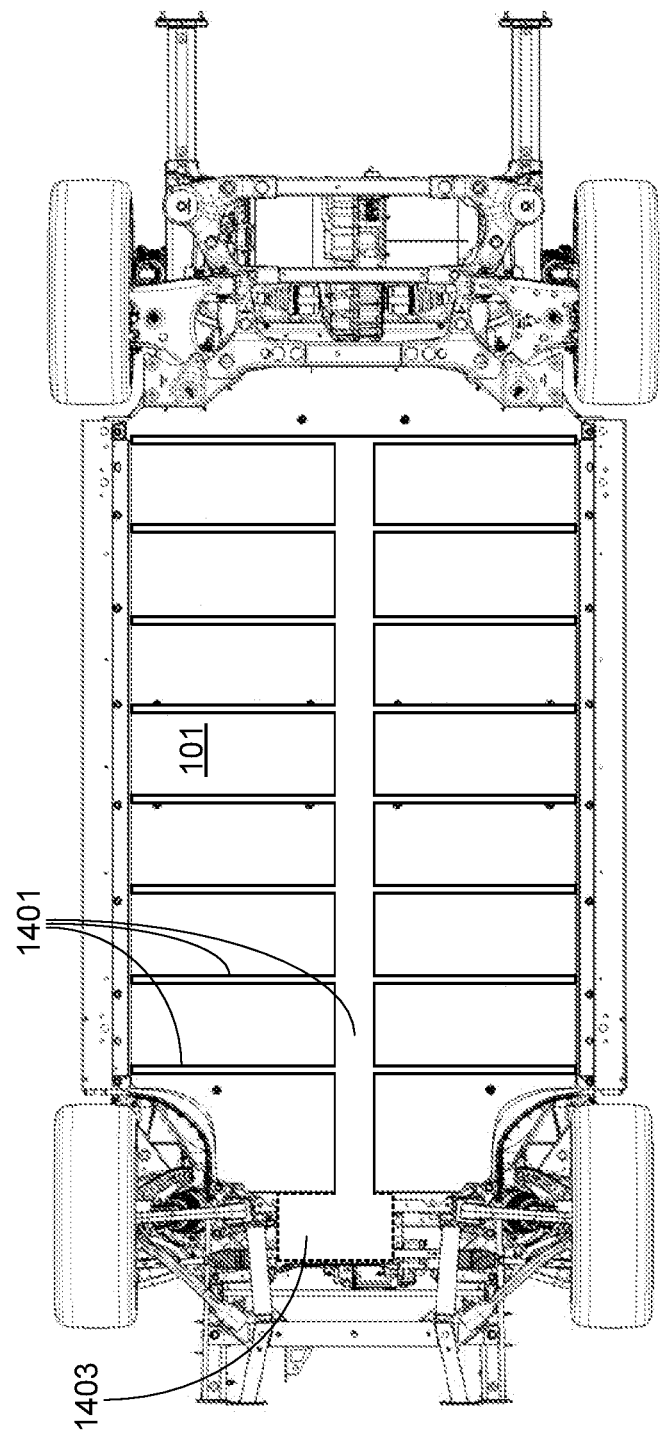
FIG. 14 provides a simplified bottom view, similar to that provided in FIG. 3, with the addition of cooling channels.

The ability of the heat exchanger of the present invention to effectively withdraw thermal energy from the various components to which it is coupled depends upon a variety of factors, including the surface area of the battery pack enclosure, the number and size of thermal exchange tubing, the thermal characteristics and the flow rate of the liquid flowing through the thermal exchange tubing, the ambient temperature, the temperature of the components coupled to the thermal management system, the velocity of the vehicle and the air passing beneath the battery pack, and whether or not the base plate includes fins or other thermally conductive members (e.g., fins 1101). Accordingly, the inventors have found that in some embodiments it is necessary to force air past the battery pack base plate when the vehicle is moving slowly or at a standstill, for example during charging. While it will be appreciated that there are numerous techniques that may be used to force air past the base plate, preferably the base plate includes one or more closed channels that are coupled to a blower fan. The channels may either be open channels, e.g., slots 1201 shown in the schematic cross-sectional view shown in FIG. 12, or closed channels, e.g., channels 1301 shown in the schematic cross-sectional view shown in FIG. 13. While the channel configurations shown in FIGS. 12 and 13 are based on the embodiment shown in FIG. 10, it will be appreciated that they are equally applicable to other base plate heat exchanger configurations. FIG. 14 provides a similar view of the bottom of battery pack 101 as that shown in FIG. 3, with the addition of channels 1401 where channels 1401 are comprised of either open slots or closed channels. In this exemplary configuration, air is forced into channels 1401 by a blower 1403. Blower 1403 is shown in phantom as it is located within the vehicle and coupled to channels 1401 via an air duct. Note that this is only an exemplary configuration and that other configurations may be used to force air past the base plate heat exchanger.

It will be appreciated that the battery pack base plate heat exchanger of the present invention may be thermally coupled to any of a variety of vehicle components and may use any of a variety of different thermal management systems to configure, and provide control over, the thermal performance of the various vehicle thermal subsystems (e.g., refrigeration subsystem, passenger cabin HVAC subsystem, drive train subsystem, battery subsystem). Preferably the thermal management system allows the base plate heat exchanger to be thermally coupled to the batteries within the battery pack when necessary, and alternately to be thermally decoupled from the batteries within the battery pack when necessary. Preferably the thermal management system utilizing the base plate heat exchanger also includes a controller (e.g., processor), with the controller being either a dedicated thermal management system controller or utilizing the vehicle control system.

Figure 15:
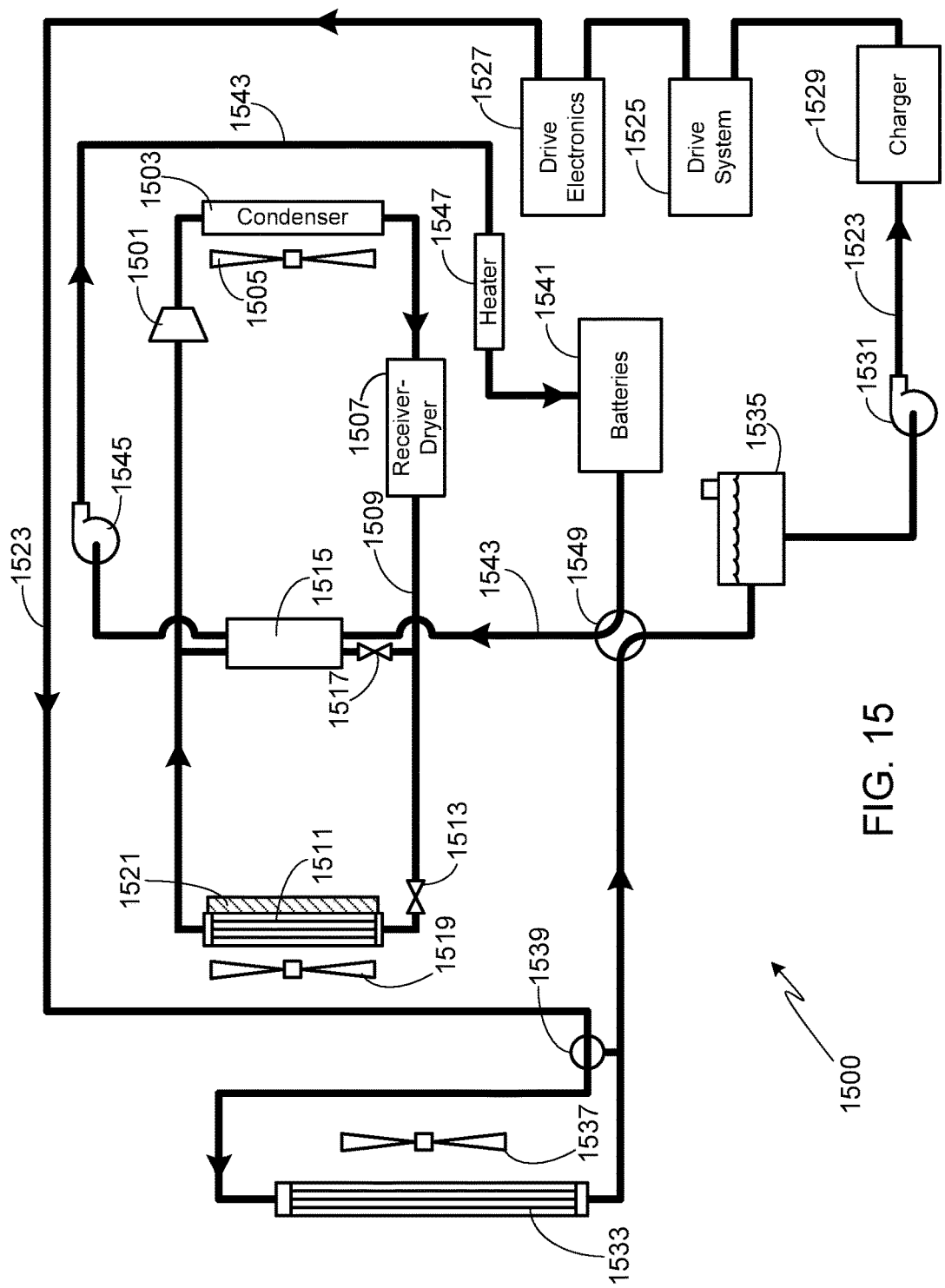
FIG. 15 illustrates a preferred embodiment of a thermal management system utilizing the base plate heat exchanger of the invention.
Figure 16:
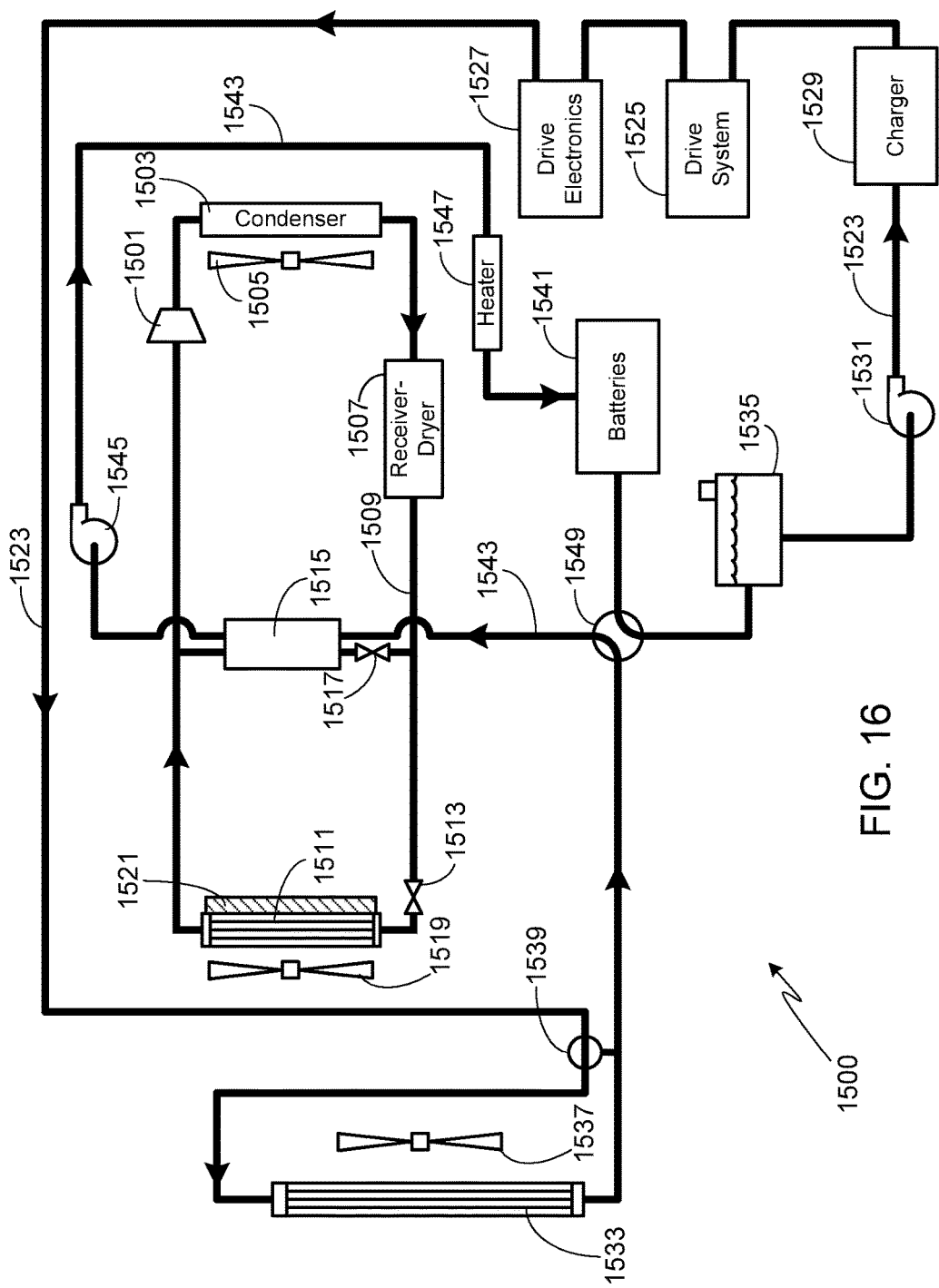
FIG. 16 illustrates the thermal management system shown in FIG. 15, configured to allow the drive train and battery subsystems to operate in series rather than in parallel.
Figure 17:
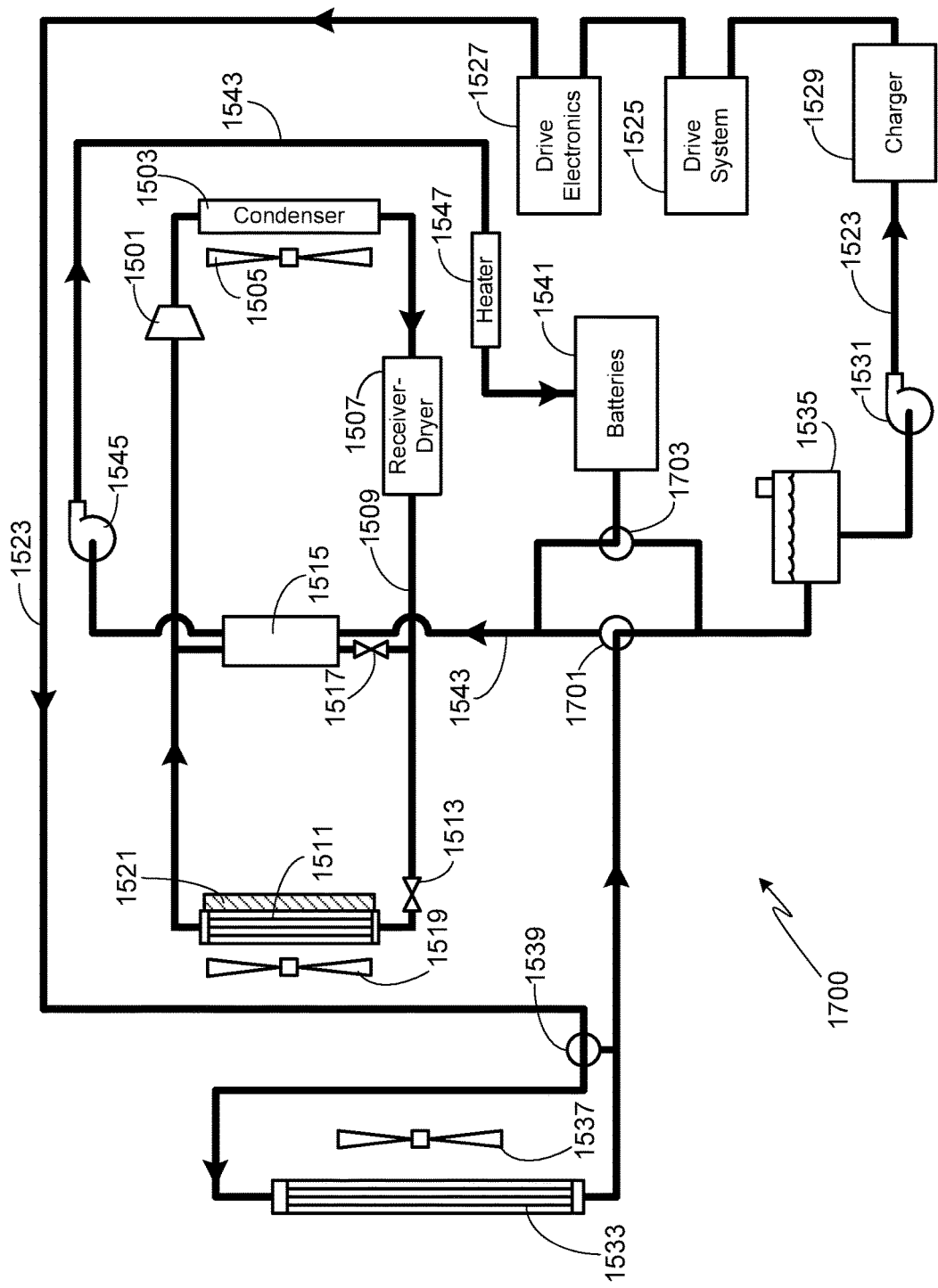
FIG. 17 illustrates the thermal management system shown in FIG. 15, modified to use two, three-way valves instead of a single, four-way valve to switch between operational modes.
Figure 18:
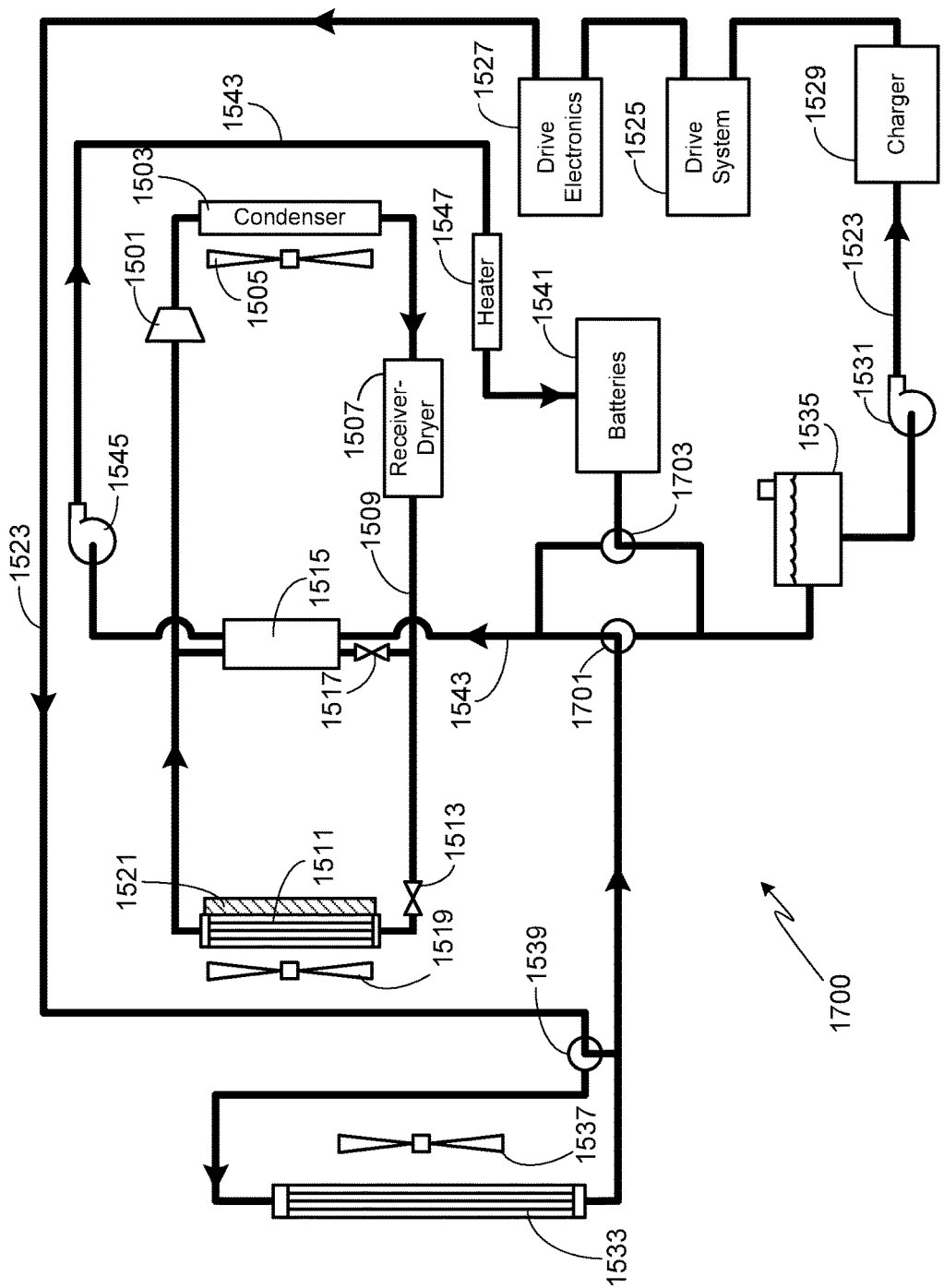
FIG. 18 illustrates the thermal management system shown in FIG. 16, modified to use two, three-way valves instead of a single, four-way valve to switch between operational modes.

FIGS. 15 and 16 illustrate an exemplary thermal management system 1500 for use with the base plate heat exchanger. FIGS. 17 and 18 illustrate an alternate thermal management system 1700 utilizing a pair of three-way valves, rather than a single four-way valve, to control the configuration and interplay of the various thermal subsystems.

Thermal management system 1500 includes a cooling subsystem, preferably a refrigerant-based cooling subsystem, that is designed to be thermally coupled to one or more of the other thermal subsystems comprising the overall system whenever it is necessary or desirable to reduce the temperature in the thermally-coupled subsystem. In the exemplary embodiment shown in FIGS. 15-18, this cooling subsystem includes a compressor 1501 that compresses the low temperature refrigerant (e.g., R134a) vapor in the subsystem into a high temperature vapor. The refrigerant vapor then dissipates a portion of the captured heat when it passes through condenser 1503, thereby leading to a phase change from vapor to liquid, where the remaining liquid is at a temperature below the saturation temperature at the prevailing pressure. Preferably the performance of condenser 1503 is enhanced by using a blower fan 1505. The liquid phase refrigerant then passes through a receiver-dryer 1507 that removes moisture from the condensed refrigerant. In the illustrated embodiment, refrigerant line 1509 is coupled to a passenger cabin evaporator 1511 via a thermal expansion valve 1513, and to a heat exchanger 1515 (also referred to herein as a chiller) via a thermal expansion valve 1517. Thermal expansion valves 1513 and 1517 control the flow rate of refrigerant into evaporator 1511 and chiller 1515, respectively.

Thermal system 1500 includes a heating, ventilation and cooling (HVAC) subsystem that provides temperature control for the vehicle's passenger cabin, typically via a plurality of ducts and vents. Preferably the HVAC subsystem includes one or more fans 1519 that are used to circulate air throughout the cabin on demand, regardless of whether the air is heated, cooled, or simply fresh air from outside the vehicle. To provide cool air, refrigerant is circulated through evaporator 1511. To provide warm air during normal vehicle operation, the HVAC subsystem may utilize a heater 1521, for example an electric heater (e.g., a PTC heater) integrated within evaporator 1511. Although not shown, in an alternate embodiment the HVAC subsystem may include means such as a heat exchanger for transferring thermal energy from either the drive train subsystem or the battery subsystem to the HVAC subsystem.

The drive train subsystem is comprised of a continuous power train cooling loop 1523 that is used to cool various components associated with the drive train. Preferably cooling loop 1523 is coupled to the drive system 1525. Drive system 1525 may include the vehicle's traction motor and/or the transmission. It will be appreciated that the system is equally applicable to vehicles using both single drive motors and multiple drive motors, e.g., a drive motor per axle or per wheel. Preferably cooling loop 1523 is also thermally coupled to other vehicle electronic components, for example the power electronics module and inverter 1527 used with the vehicle's traction motor(s). If the vehicle includes a charger 1529 for charging the rechargeable batteries using an external power source, preferably the charger is coupled to cooling loop 1523 as well. Alternately, charger 1529 may be coupled to the cooling loop used with the batteries within the battery pack. In at least one embodiment, the system electronics (e.g., power electronics 1527) are mounted to a cold plate that is used to transfer the heat away from the electronics and into the liquid coolant (i.e., the heat transfer medium) contained in the cooling loop. Cooling loop 1523, which also includes a coolant circulation pump 1531, is coupled to the battery pack base plate heat exchanger 1533 described in detail above as well as a coolant reservoir 1535. As noted previously, a blower fan 1537 may be used to force air past the base plate heat exchanger 1533 when insufficient air is flowing past the heat exchanger to achieve the desired level of cooling, for example when the vehicle is not moving. In the preferred and illustrated embodiment, preferably a heat exchanger bypass valve 1539 is included that provides a means for controlling flow of coolant through, or completely decoupling of, the heat exchanger 1533 from coolant loop 1523. In FIG. 15 valve 1539 is positioned to couple base plate heat exchanger 1533 to coolant loop 1523.

Within the battery pack enclosure, and as described above, are a plurality of batteries 1541 that are coupled to a coolant loop 1543 containing a coolant (i.e., a heat transfer medium). One or more circulation pumps 1545 pump the coolant within coolant loop 1543 that is used to control the temperature of batteries 1541, typically via a heat transfer plate or one or more coolant conduits (not shown) that are in thermal communication with the batteries. Although a dedicated cooling subsystem may be used in conjunction with the battery subsystem, preferably the coolant contained in loop 1543 is cooled via heat transfer with the refrigerant in heat exchanger 1515, assuming that the thermostatic valve 1517 allows refrigerant to pass through heat exchanger 1515. Additionally, in a preferred embodiment cooling loop 1543 is also thermally coupled to a heater 1547 (e.g., a PTC heater), thus insuring that the temperature of batteries 1541 can be maintained within their preferred operating range regardless of the ambient temperature.

It will be appreciated that there are numerous techniques that may be used by the thermal management system to control the operation of the individual thermal management subsystems in general, and more specifically the amount of cooling supplied by the refrigeration subsystem to the other subsystems. Typically the control system uses a plurality of temperature detectors (not shown) to monitor the temperature within the various vehicle components (e.g., batteries 1541, motor/transmission 1525, drive electronics 1527, etc.), within one or more regions of the coolant loops (e.g., coolant loop 1523, etc.), and within one or more locations within the passenger cabin. The monitored temperatures at these various locations are used by the control system to determine the operation of the various thermal management subsystems. In response to the monitored temperatures and the desired temperature range for the cabin and the various vehicle components, the amount of heating and/or cooling applied by each subsystem is regulated, for example via flow valves (not shown) within the coolant loops, pump rates of the various circulation pumps (e.g., pumps 1531 and 1545), heater operation (e.g., heaters 1521 and 1547), and blower fan operation (e.g., fans 1505, 1519, 1537). The controller may operate automatically based on programming implemented by a processor, or the control system may be manually controlled, or the control system may use some combination of manual and automated control.

In addition to controlling refrigerant flow rates, coolant flow rates and the operation of the heaters, fans, etc., the illustrated thermal management system allows the overall architecture as well as the utilization of the battery pack base plate heat exchanger to be quickly and easily altered, thus providing different means of controlling and routing thermal energy among the vehicle's subsystems. As a result, the thermal management system provides a sophisticated and flexible way to respond to changing environmental conditions (e.g., varying air temperature, solar loading, etc.) as well as changing vehicle component thermal loads and requirements.

In the parallel configuration illustrated in FIG. 15, the drive system components (e.g., drive electronics 1527, motor/transmission 1525, charger 1529) are thermally decoupled from the battery temperature control system (e.g., coolant loop 1543), thereby allowing independent operation of each. In this configuration the base plate heat exchanger 1533 is coupled to the drive system components, assuming valve 1539 is positioned as shown. FIG. 16 illustrates thermal management system 1500 reconfigured in a serial architecture, thereby thermally coupling the drive system components to the battery temperature control system, both of which may be coupled to the base plate heat exchanger 1533 via valve 1539. In system 1500 this change in thermal architecture is achieved by repositioning valve 1549 which, in this embodiment, is a four-way cylindrical, butterfly or ball valve.

In the serial configuration, coolant is initially pumped through coolant line 1523, which is thermally coupled to drive system 1525 (e.g., motor(s) and/or transmission), drive electronics 1527 and charger 1529. After passing by the drive train components, and as shown in FIG. 16, valve 1549 couples coolant line 1523 to coolant line 1543, thereby allowing the flowing coolant to pass through batteries 1541 after being warmed by the drive train components as shown. As in the previous figure, valve 1539 is positioned to thermally couple the coolant loop, which in the serial configuration is comprised of both coolant loops 1523 and 1543, to the battery pack base plate heat exchanger 1533.

It will be appreciated that the illustrated thermal management system easily adapts to changes in both the external environment and the current operating characteristics of the vehicle's various thermally coupled components, both by allowing the battery thermal control subsystem and the drive train thermal control subsystem to be configured in either series or parallel, and by allowing the base plate heat exchanger to be either coupled or decoupled from the various cooling loops. As a result, both thermal and performance optimization may be achieved, leading to improved efficiency and associated operating cost savings. It should be understood, however, that the individual components and layout of the various thermal subsystems may vary from those in the exemplary embodiment without departing from the invention, e.g., the type of cooling/refrigeration subsystem, the way in which the cabin HVAC subsystem is coupled to the other subsystems, the number of heat exchangers, the number of circulating pumps/radiators/fans, etc. may all differ from system 1500 without departing from the underlying invention of a battery pack base plate heat exchanger.

FIGS. 17 and 18 correspond to a minor modification of the thermal management system shown in FIGS. 15 and 16, respectively, specifically replacing four-way valve 1549 with a pair of three-way valves 1701 and 1703. Although systems 1500 and 1700 operate in the same manner and offer the same performance and efficiency advantages, it will be appreciated that the use of a single four-way valve is preferred over two, three-way valves in order to reduce part count, cost, and system complexity while improving reliability. Note that in FIG. 18 base plate heat exchanger bypass valve 1539 is shown in the bypass position, as opposed to the active heat exchanger position shown in FIGS. 15-17, thus illustrating this aspect of the invention.

It should be understood that identical element symbols used on multiple figures refer to the same component, or components of equal functionality. Additionally, the accompanying figures are only meant to illustrate, not limit, the scope of the invention and should not be considered to be to scale.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention which is set forth in the following claims.

The invention claimed is:

1. An integrated battery pack heat exchanger system, comprising:
 a battery pack enclosure mounted under an electric vehicle, wherein said battery pack enclosure comprises an enclosure top panel, an enclosure base plate fabricated from a thermally conductive material having a thermal conductivity greater than 1.05 W/m-K, a plurality of enclosure side members, and at least one coolant conduit, wherein said battery pack enclosure is configured to hold a plurality of batteries, wherein said battery pack enclosure is mounted between a passenger cabin floor panel and a driving surface, wherein an outside surface of said enclosure base plate is exposed to an ambient environment outside of said electric vehicle, and wherein ambient air flows past said outside surface of said enclosure base plate during motion of said electric vehicle;
 a plurality of heat exchanger conduits mechanically and thermally coupled to an inside surface of said enclosure base plate; and
 a thermal management system coupled to said integrated battery pack heat exchanger system and controlling operation of said integrated battery pack heat exchanger system, wherein said plurality of heat exchanger conduits are thermally coupled, via said at least one coolant conduit, to said plurality of batteries when said thermal management system configures said integrated battery pack heat exchanger system into a first operational mode, and wherein said plurality of heat exchanger conduits are thermally decoupled from said plurality of batteries when said thermal management system configures said integrated battery pack heat exchanger system into a second operational mode.

2. The integrated battery pack heat exchanger system of claim 1, wherein said plurality of heat exchanger conduits are thermally coupled to at least one of a vehicle traction motor, a transmission, a battery charging system, or a power electronics module when said thermal management system configures said integrated battery pack heat exchanger system into either said first operational mode or said second operational mode.

3. The integrated battery pack heat exchanger system of claim 2, further comprising a heat exchanger bypass valve, wherein said heat exchanger bypass valve in a first position thermally couples said plurality of heat exchanger conduits to at least one of said vehicle traction motor, said transmission, said battery charging system, or said power electronics module when said integrated battery pack heat exchanger system is in either said first operational mode or said second operational mode, and wherein said heat exchanger bypass valve in a second position circumvents said plurality of heat exchanger conduits and decouples said plurality of heat exchanger conduits from said vehicle traction motor, said transmission, said battery charging system, or said power electronics module when said integrated battery pack heat exchanger system is in either said first operational mode or said second operational mode.

4. The integrated battery pack heat exchanger system of claim 1, further comprising a layer of a thermally insulating material interposed between said plurality of batteries and said plurality of heat exchanger conduits, wherein said layer of said thermally insulating material thermally isolates said plurality of batteries from said plurality of heat exchanger conduits.

5. The integrated battery pack heat exchanger system of claim 4, wherein said layer of a thermally insulating material has a thermal conductivity of less than 1.0 W/m-K.

6. The integrated battery pack heat exchanger system of claim 1, wherein said plurality of heat exchanger conduits are mechanically and thermally coupled to said inside surface of said enclosure base plate using a coupling technique selected from the group consisting of brazing, soldering, welding and bonding.

7. The integrated battery pack heat exchanger system of claim 1, further comprising a blower fan, wherein said blower fan directs air over said outside surface of said enclosure base plate.

8. The integrated battery pack heat exchanger system of claim 7, wherein said blower fan is mounted within said electric vehicle, and wherein an air duct directs air flow from said blower fan over said outside surface of said enclosure base plate.

9. The integrated battery pack heat exchanger system of claim 7, further comprising at least one slot integrated into said outside surface of said enclosure base plate.

10. The integrated battery pack heat exchanger system of claim 1, further comprising a blower fan and at least one closed channel integrated into said outside surface of said enclosure base plate, wherein said blower fan directs air through said at least one closed channel integrated into said outside surface of said enclosure base plate.

11. The integrated battery pack heat exchanger system of claim 1, further comprising:
- a first coolant loop coupled to said at least one coolant conduit, said first coolant loop comprising a first circulation pump for circulating a coolant within said first coolant loop;
- a second coolant loop thermally coupled to said plurality of heat exchanger conduits and to at least one of a vehicle traction motor, a transmission, a battery charging system, or a power electronics module, said second coolant loop comprising a second circulation pump for circulating said coolant within said second coolant loop; and
- a dual mode valve system coupled to said thermal management system, wherein in said first operational mode said dual mode valve system is configured in a first mode and wherein in said second operational mode said dual mode valve system is configured in a second mode, wherein when said dual mode valve system is configured in said first mode said first coolant loop is serially coupled to said second coolant loop, and wherein when said dual mode valve system is configured in said second mode said first coolant loop operates in parallel with and separate from said second coolant loop.

12. The integrated battery pack heat exchanger system of claim 11, further comprising a heat exchanger bypass valve integrated into said second coolant loop, wherein said heat exchanger bypass valve controls flow of said coolant through said plurality of heat exchanger conduits.

13. The integrated battery pack heat exchanger system of claim 11, wherein said dual mode valve system is comprised of a four-way valve, wherein said four-way valve configured in said first mode couples a first portion of said first coolant loop to a second portion of said second coolant loop and couples a first portion of said second coolant loop to a second portion of said first coolant loop, and wherein said four-way valve configured in said second mode couples said first portion of said first coolant loop to said second portion of said first coolant loop and couples said first portion of said second coolant loop to said second portion of said second coolant loop.

14. The integrated battery pack heat exchanger system of claim 11, further comprising a refrigeration subsystem thermally coupleable to said first coolant loop via a refrigeration subsystem heat exchanger.

15. The integrated battery pack heat exchanger system of claim 14, wherein said refrigeration subsystem further comprises a refrigerant, a compressor, a condenser and a thermostatic expansion valve.

16. The integrated battery pack heat exchanger system of claim 14, further comprising a cabin heating, ventilation and cooling (HVAC) subsystem thermally coupleable to said refrigeration subsystem via said refrigeration subsystem heat exchanger.

17. The integrated battery pack heat exchanger system of claim 11, further comprising a heater thermally coupled to said first coolant loop.

* * * * *